(12) United States Patent
Pelletier

(10) Patent No.: US 6,908,357 B2
(45) Date of Patent: Jun. 21, 2005

(54) SYSTEM FOR FRAME SELECTOR MIGRATION IN 3G CELLULAR NETWORKS

(75) Inventor: Larry Edward Pelletier, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 467 days.

(21) Appl. No.: 10/231,558

(22) Filed: Aug. 30, 2002

(65) Prior Publication Data

US 2004/0043768 A1 Mar. 4, 2004

(51) Int. Cl.[7] ................................................. H04Q 7/20
(52) U.S. Cl. ........................ 445/436; 455/439; 455/442; 455/445; 370/331
(58) Field of Search ........................ 455/432.1, 432.2, 455/436, 438, 439, 440, 442, 445, 448; 370/328, 331

(56) References Cited

U.S. PATENT DOCUMENTS

| | | | | |
|---|---|---|---|---|
| 5,729,536 A | * | 3/1998 | Doshi et al. ................ | 370/398 |
| 6,125,110 A | * | 9/2000 | Proctor et al. ............... | 370/331 |
| 6,370,127 B1 | * | 4/2002 | Daraiseh et al. ............. | 370/328 |
| 6,452,911 B1 | * | 9/2002 | Seo ............................. | 370/335 |
| 6,631,126 B1 | * | 10/2003 | Berliner et al. ............. | 370/342 |
| 2002/0093931 A1 | * | 7/2002 | Dalal ........................... | 370/342 |
| 2004/0198349 A1 | * | 10/2004 | Chin ........................... | 455/432.1 |

* cited by examiner

*Primary Examiner*—Simon Nguyen

(57) ABSTRACT

The system for frame selector migration in 3G cellular networks enables the frame selector function to be migrated to the presently active Radio Network Controller without disruption of the call. This migration strategy functions to reduce the number of handoff legs required to serve an existing call connection, therefore more efficiently utilizing the network resources. The system for frame selector migration in 3G cellular networks also optionally uses a hierarchy of frame selectors, which makes use of multiple levels of frame selectors in the cellular network to simplify the migration of the frame selector function.

16 Claims, 11 Drawing Sheets

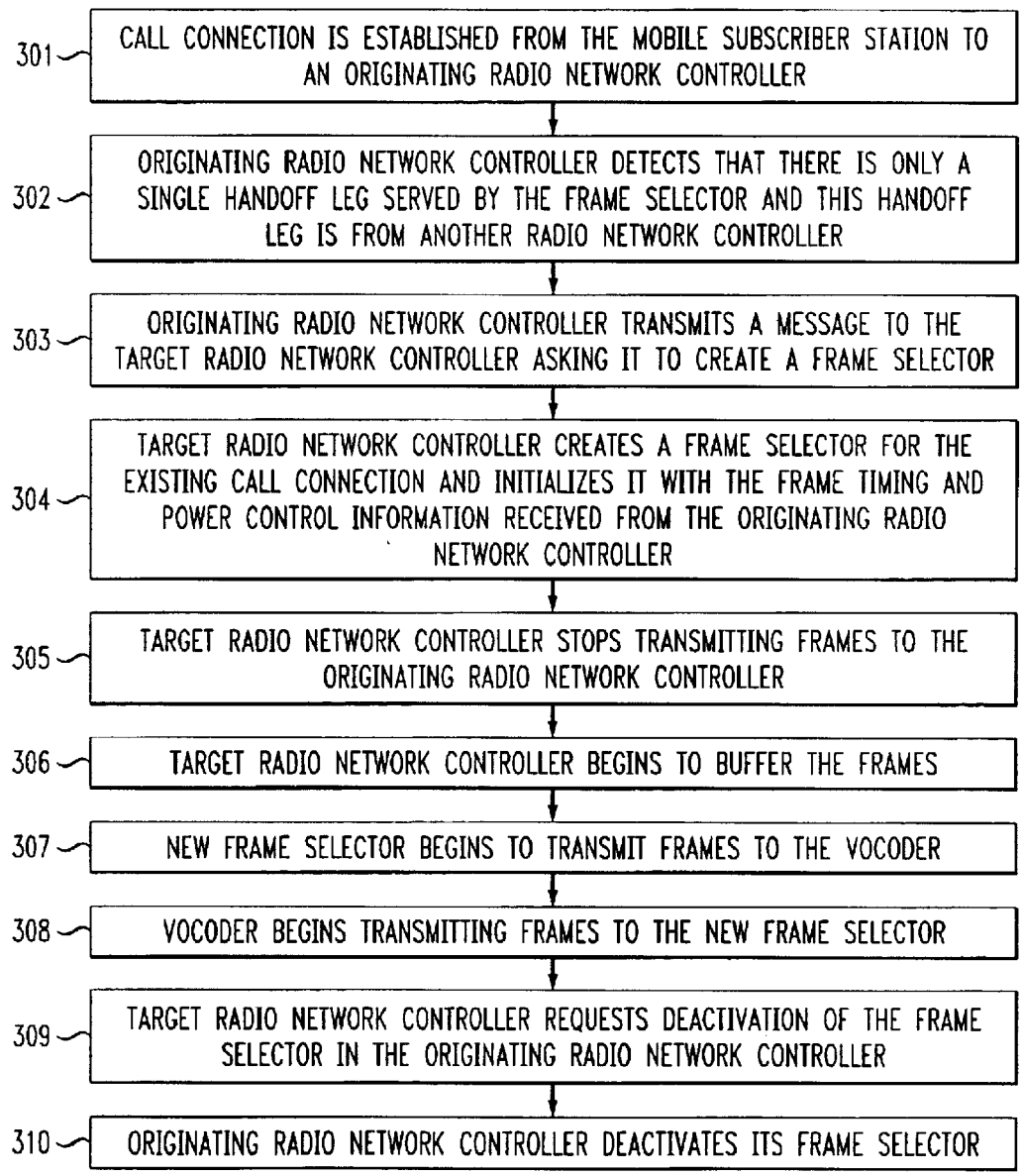

SYSTEM FOR FRAME SELECTOR MIGRATION IN 3G CELLULAR NETWORKS

FIELD OF THE INVENTION

This invention relates to third generation (3G) cellular networks having centralized vocoders and a static frame selector assignment for serving cellular calls.

PROBLEM

It is a problem in third generation (3G) cellular network architectures to provide mobile subscriber stations with service in a manner that efficiently uses the available network bandwidth. In existing 3G cellular networks, centralized vocoders are used in conjunction with frame selectors to provide the signal transmission capability for serving call connections. The centralization of the vocoders, by placing the vocoders in the core network rather than the Base Station or Radio Network Controller, reduces the bandwidth needed in the cellular network. The frame selectors needed for soft handoff have remained in the Radio Network Controller, since these elements cannot be centralized. However, as the mobile subscriber station moves further from the Radio Network Controller that houses the frame selector, multiple traffic legs must connect the frame selector to the base stations that communicate with the mobile subscriber station. The number and resultant length of the soft handoff legs grows as the mobile subscriber station moves further away from its initial location, thereby increasing the engineered cost to the service provider. Reducing the length of the multiple soft handoff legs can therefore save additional bandwidth and make power control more efficient.

In second generation cellular networks, the vocoder is colocated with the frame selector in the Radio Network Controller and moving the vocoder via hard handoff or semi-hard handoff from one Radio Network Controller to another shortens the length of the handoff legs. However, in third generation cellular networks, moving the vocoder negates the savings gained by separating the vocoder from the frame selector. In addition, moving the vocoder disrupts the call, causing poorer call quality and increasing the chances that the call will be dropped.

SOLUTION

The above-described problems are solved and a technical advance achieved by the present system for frame selector migration in 3G cellular networks that uses migration of the frame selector function to reduce the number of handoff legs required to serve an existing call connection.

When the originating Radio Network Controller, which is equipped with the frame selector that serves an existing call, detects that there is only one handoff leg in communication with the frame selector and that the handoff leg is from another Radio Network Controller (target), it initiates migration of the frame selector function to the target Radio Network Controller. The originating Radio Network Controller transmits a message to the target Radio Network Controller asking it to create a frame selector for this call. This message contains frame timing and power control information necessary for the new frame selector to coordinate the existing call with both the vocoder and the mobile subscriber station. The originating Radio Network Controller continues to transmit frames, received from the target Radio Network Controller, to the vocoder and frames, received from the vocoder, to the target Radio Network Controller. The target Radio Network Controller creates a frame selector for the call and initializes it with the information received from the originating Radio Network Controller. The target Radio Network Controller stops transmitting frames to the originating Radio Network Controller and begins to buffer them at the new frame selector and begins to transmit frames to the vocoder. When the target Radio Network Controller begins to receive frames from the vocoder, it transmits a message to the originating Radio Network Controller to request deactivation of the frame selector that is used for this call.

The system for frame selector migration in 3G cellular networks also optionally uses a hierarchy of frame selectors, which makes use of multiple levels of frame selectors in the cellular network to simplify the migration of the frame selector function. The primary frame selector is located at the Radio Network Controller where the call is established. As additional handoff legs are added from cells on another Radio Network Controller to maintain service for the roving mobile subscriber station, a secondary frame selector is established in that target Radio Network Controller. All handoff legs that are established on the target Radio Network Controller connect to the secondary frame selector activated in the target Radio Network Controller. When the last handoff leg on the target Radio Network Controller is dropped, the secondary frame selector is also removed and the frame selector function is migrated to a Radio Network Controller that presently serves the mobile subscriber station. The secondary frame selector only selects the best handoff leg as is done in softer handoff at a cell. This approach uses only one soft handoff leg per Radio Network Controller to traverse to the primary frame selector rather than one leg per cell. In most cases only one handoff leg is needed, rather than two or three that might exist without this approach. Since frame selectors are added when handoff legs are added and frame selectors are dropped when handoff legs are dropped, there is no disruption of the call.

BRIEF DESCRIPTION OF THE DRAWINGS

FIG. 3 illustrates in flow diagram form the operation of the system for frame selector migration in 3G cellular networks to reduce the number of legs required to serve a call;

DETAILED DESCRIPTION

Existing 3G Cellular Networks with Centralized Vocoders

A problem in cellular communication networks is that the need to concurrently serve many subscribers with the limited bandwidth available in cellular communication networks has prevented the provision of wide bandwidth communication services, such as data, to these subscribers. The third generation (3G) wireless communication systems, as specified by the 3GPP—WCDMA and 3GPP2—CDMA2000 requirements for cellular communications, represent a step toward solving this problem. The third generation wireless communication systems support the provision of advanced packet data services. The Wideband Code Division Multiple Access (WCDMA) platform operates as a Code Division Multiple Access wireless network in a Wideband format (the "W" in WCDMA). The RF carriers are 4.4 to 5.0 MHz wide in the spectral domain with each RF carrier supporting multiple simultaneous "channels" subdivided in the code domain. The data streams are spread using code words which enables processing gain at the receiver thereby improving the quality of reception both in terms of BLER/BER (Block Error Rate and Bit Error Rate) and overall improvement in signal levels with respect to noise and interference (Ec/Io). The receiver accomplishes this "process gain" through the use of up to eight (formerly four with IS-95) Rake receivers, all operating on different code words on the same frequency of reception. WCDMA, like the CDMA2000 family and IS-95, uses Dynamic Power Control (DPC) to manage self-inference generated by users communicating on the same frequency. WCDMA has both forward and reverse path fast Dynamic Power Control at 1500 Hz (while IS-95 is at 800 Hz in the reverse path only).

Figure 1:
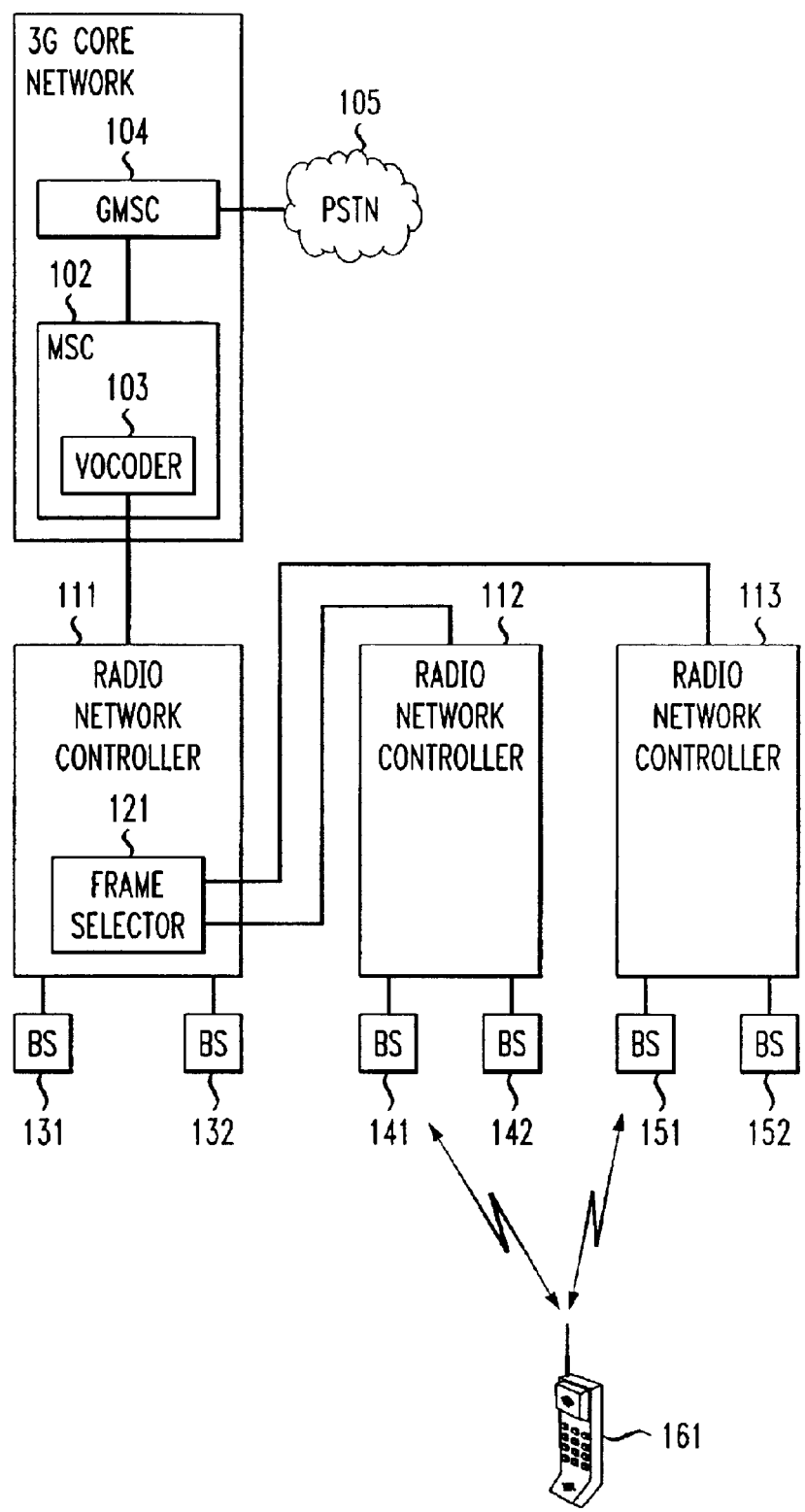
FIG. 1 illustrates in block diagram form the existing architecture used in 3G cellular networks to manage call connections using a centralized vocoder.

FIG. 1 illustrates in block diagram form the existing architecture used in 3G cellular networks to manage call connections using a centralized vocoder. The 3G cellular network 100 consists of a core network 101 that includes a Mobile Switching Center 102 which is connected to a Gateway Mobile Services Switching Center (GMSC) 104 as well as to the Radio Network Controllers 111–113, with the Gateway Mobile Services Switching Center 104 serving to interconnect the Mobile Switching Center 102 with the Public Switched Telephone Network 105. The Mobile Switching Center 102 is equipped with the vocoder 103 and serves a plurality of Radio Network Controllers 111–113. Each Radio Network Controller 111–113 serves a plurality of Base Stations 131–132, 141–142, 151–152, respectively, which in turn communicate with the mobile subscriber stations, such as 161. The centralized vocoder 103 is used in conjunction with the frame selector 121 in the call originating Radio Network Controller 111 to provide the signal transmission capability for serving call connections. The centralization of the vocoders, by placing the vocoder 103 in the core network 101 rather than the Base Station or Radio Network Controller, reduces the bandwidth needed in the cellular network. The frame selectors 121 needed for soft handoff have remained in the Radio Network Controller 111, since these elements cannot be centralized. However, as the mobile subscriber station moves further from the Radio Network Controller 111 that houses the frame selector 121, multiple traffic legs must connect the frame selector to the base stations that communicate with the mobile subscriber station 161. The number and resultant length of the soft handoff legs grows as the mobile subscriber station 161 moves further away from its initial location, thereby increasing the engineered cost to the service provider. Reducing the length of the multiple soft handoff legs can therefore save additional bandwidth and make power control more efficient.

Handovers, or handoffs, are managed by network equipment directly connected to the Base Stations. In WCDMA, this equipment is called a Radio Network Controller (RNC) versus a Base Station Controller (BSC) in IS-95. Despite the name change, the devices perform similar functions. The 5 MHz carrier creates an environment for improved multi-path fading resistance due to the broadband nature of the carrier. Selective frequency fades at any given frequency or narrowband of frequencies do not occur at the same time and the matched filter reception processor does not "see" these deep frequency selective fades. Unlike the CDMA2000 family, the transmissions in WCDMA, while circuit switched in nature, are packetized into 10 millisecond frames for the over-the-air interface. These frames contain multiple, simultaneous code-divided channels called Dedicated Channels (DCHs) and associated network signaling control channels such as Forward Access Channel (FACH), Reverse Access Channel (RACH) and so on. The Dedicated Channel is the primary bearer of traffic or content to/from the wireless subscriber device 161 to the Base Station 131. Within each frame, the bit rate is variable for any given user channel and is managed by the network to optimize delivery of traffic/content in a spectrally efficient manner. So, for example, Dedicated Channel One on Frame One may have a low bit rate (relative) but on Frame Two, Dedicated Channel One may change to a high bit rate (again relative). This process is done for each frame, on a frame-by-frame basis and incorporates the traffic profile of each code divided channel. In addition, the network manages the addition and deletion of channels as traffic is added or terminated (again, in the code domain). In addition to managing the bit rates per code divided channel on a 10-millisecond time domain basis, the code word spreading on a Dedicated Channel basis is variable based on the class of service being offered. This process essentially reallocates bandwidth by increasing or decreasing the length of the spreading sequence thereby creating network defined Classes of Service. Thus, the communication of control signals between the Radio Network Controller 111 and the mobile subscriber station 161 is of great significance to maintain the timing and power control within proper limits, via the operation of the frame selector 121.

Frame Selector Migration

FIGS. 2A–2E illustrate in block diagram form the sequence of network connections used by the system for frame selector migration in 3G cellular networks 200 to reduce the number of handoff legs required to serve an existing call connection and FIG. 3 illustrates in flow diagram form the operation of the system for frame selector migration in 3G cellular networks 200 to reduce the number of handoff legs required to serve an existing call connection. In the embodiment disclosed herein, the system for frame selector migration in 3G cellular networks 200 comprises software located in the Radio Network Controllers and which is used to control the operation of the frame selectors to implement the migration of call connections among frame selectors and Radio Network Controllers.

Figure 2A:
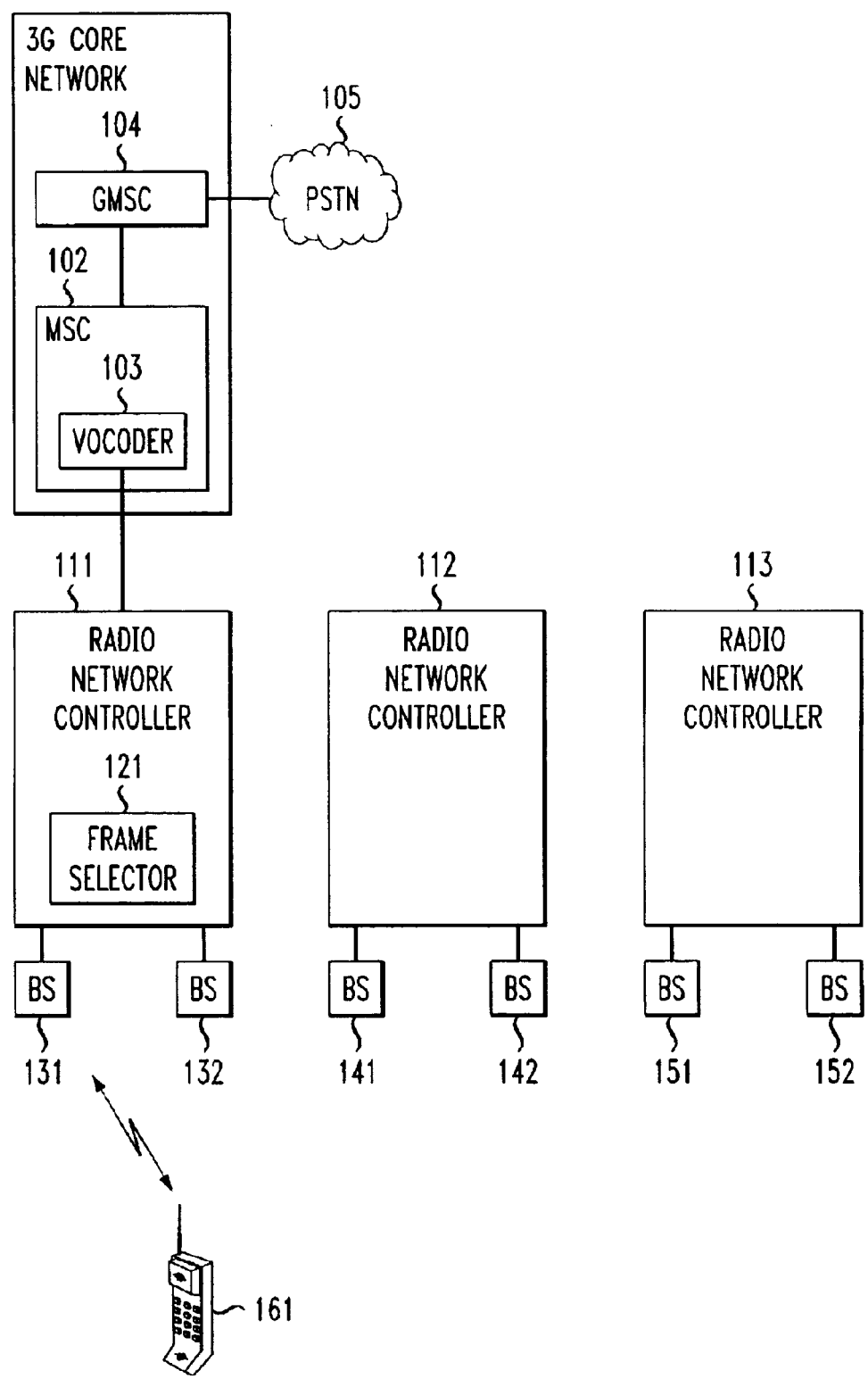
FIGS. 2A–2E illustrate in block diagram form the sequence of network connections used by the system for frame selector migration in 3G cellular networks to reduce the number of legs required to serve a call.
Figure 2B:
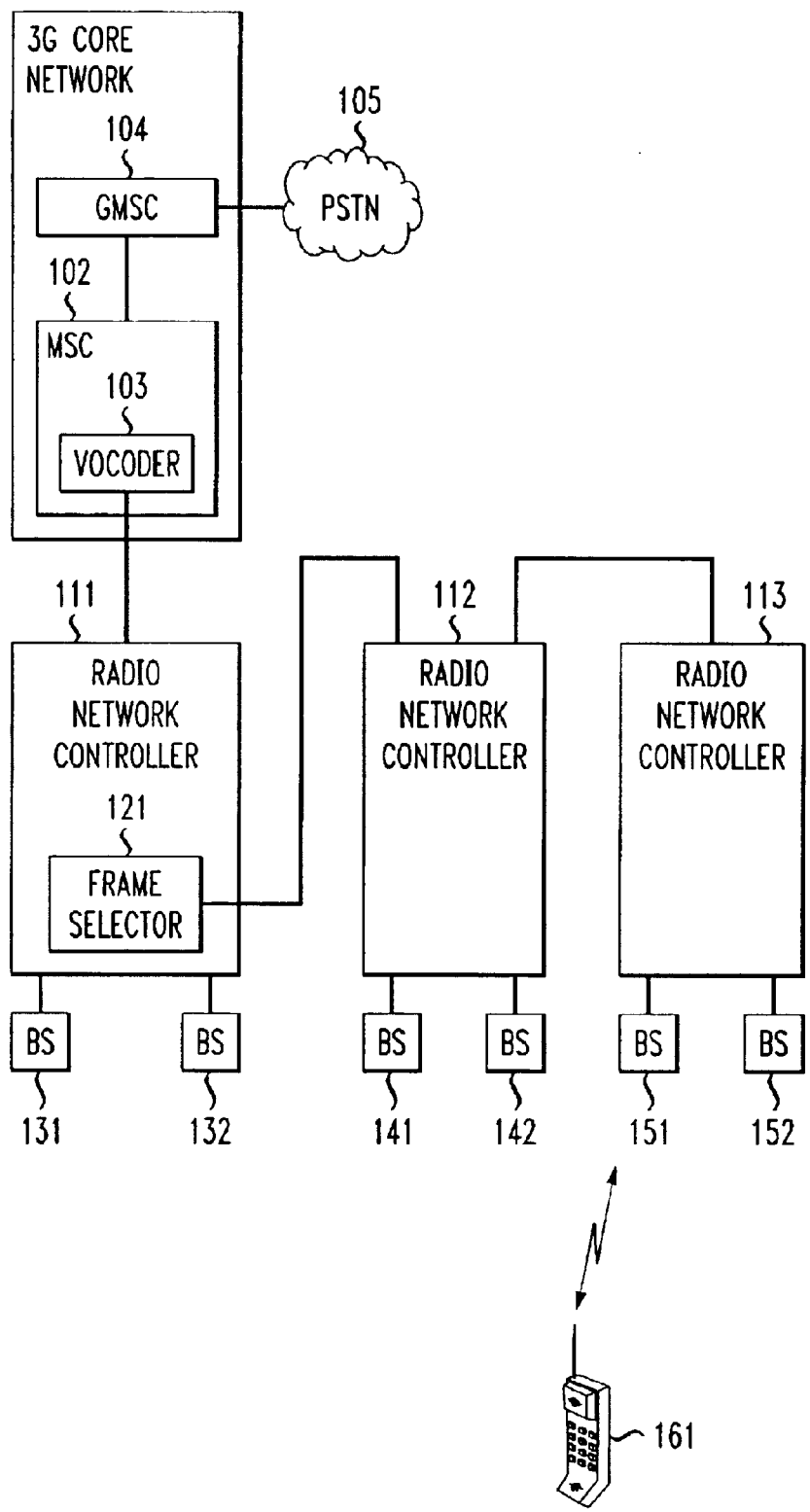
Figure 2C:
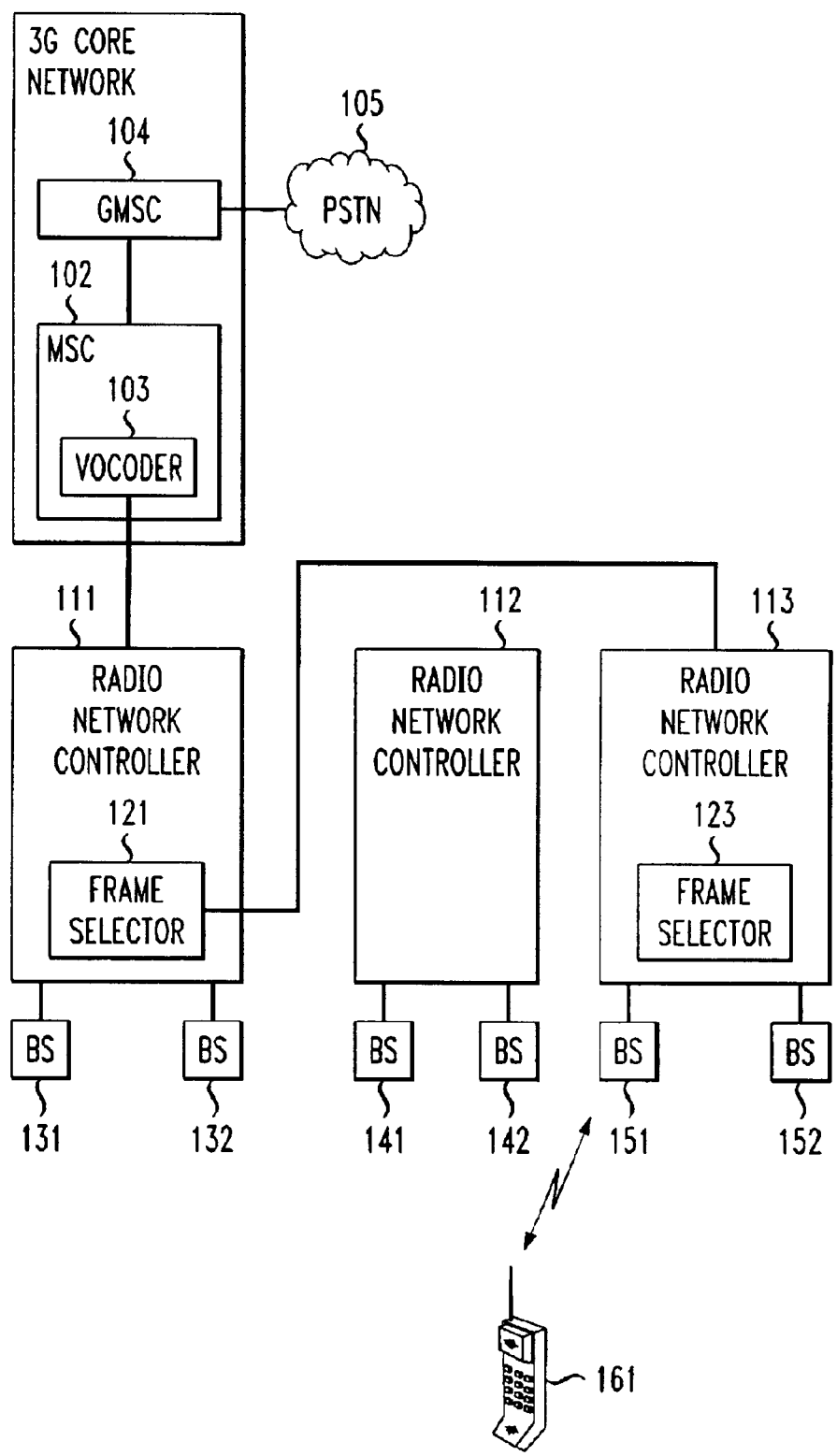
Figure 2D:
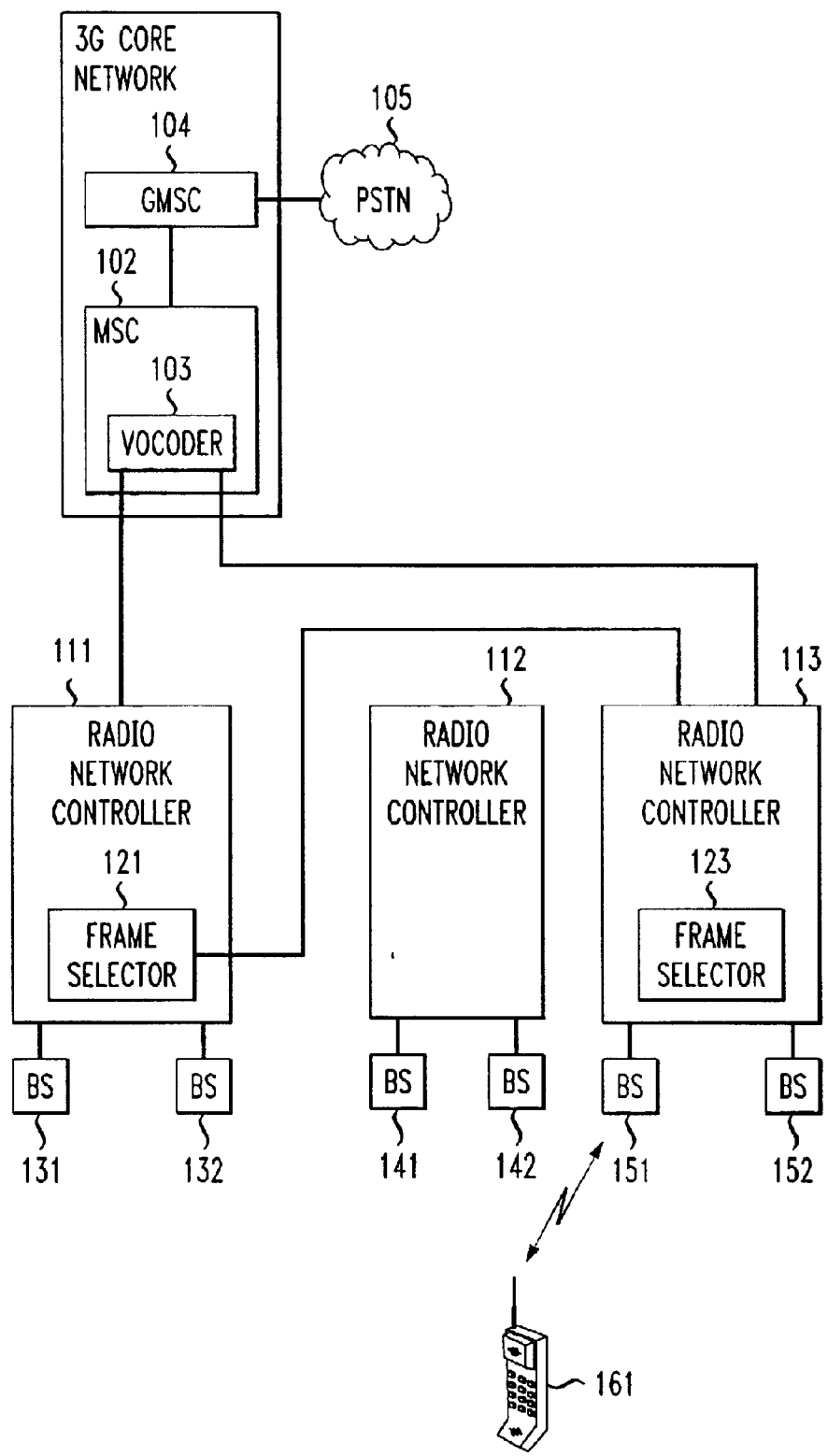
Figure 2E:
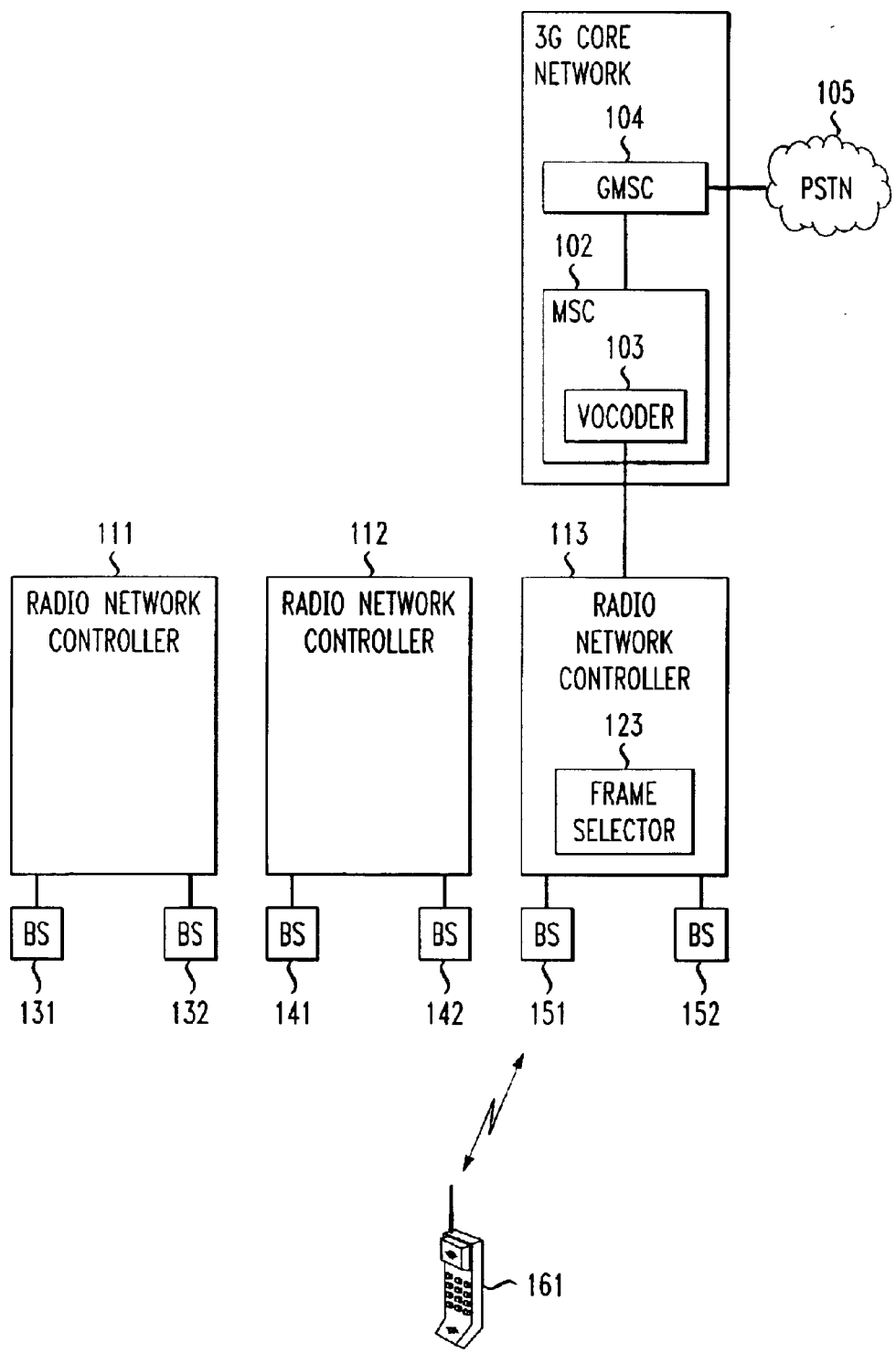

In operation, at step 301 and as illustrated in FIG. 2A, an existing call connection is established with the mobile subscriber station 161 being connected via Base Station 121 to Radio Network Controller 111 (termed the originating Radio Network Controller herein). The originating Radio Network Controller 111 is equipped with a frame selector 121 that serves to provide the frame timing and power control signals to the mobile subscriber station 161 as well as to exchange the communication signals between the mobile subscriber station 161 and the centralized vocoder 103 located in the core network 101. As the mobile subscriber station 161 roams among the cell sites, the call connection is handed off among the serving cell sites and as a result, a plurality of handoff legs connect the mobile subscriber station 161 with the frame selector 121 in the originating Radio Network Controller 111, as shown in FIG. 2B. At step 302, the originating Radio Network Controller 111 detects that there is only a single handoff leg served by the frame selector 121 and that this handoff leg is from another Radio Network Controller 113 (target) rather than among the Base Stations served by the originating Radio Network Controller 111. The originating Radio Network Controller, at step 303, transmits a message to the target Radio Network Controller 113 asking it to create a frame selector 123 for this existing call connection. This message contains the frame timing and power control information necessary for the new frame selector 123 to coordinate the existing call connection with both the vocoder 103 and the mobile subscriber station 161. The originating Radio Network Controller 111 continues to transmit frames, that are received over the single handoff leg from the target Radio Network Controller 113, to the vocoder 103 and frames, received from the vocoder 103 to the target Radio Network Controller 113 over the single handoff leg. The target Radio Network Controller 113 at step 304 creates a frame selector 123 for the existing call connection and initializes it with the frame timing and power control information received from the originating Radio Network Controller 111. The target Radio Network Controller 113 stops transmitting frames to the originating Radio Network Controller 111 at step 305 and begins at step 306 to buffer the frames at the new frame selector 123. At the appropriate time at step 307, the new frame selector 123 begins to transmit frames to the vocoder 103. The first frame transmitted from the new frame selector 123 to the vocoder 103 is marked with the address of the target Radio Network Controller 113. When the vocoder receives this marked frame at step 308, it begins transmitting frames to the new frame selector 123 in the target Radio Network Controller 113, rather than the originating Radio Network Controller 111. When the target Radio Network Controller 113 begins to receive frames from the vocoder 103 at step 309, it transmits a message to the originating Radio Network Controller 111 to request deactivation of the frame selector 121 that is used for this call. When the originating Radio Network Controller 111 receives notification from the target Radio Network Controller 113 that it is receiving frames from the vocoder 103, the originating Radio Network Controller 111 flushes out its buffers and deactivates its frame selector 121 at step 310.

This mechanism enables the frame selector function to be migrated to the presently active Radio Network Controller without disruption of the call. This migration strategy functions to reduce the number of handoff legs required to serve an existing call connection, therefore more efficiently utilizing the network resources.

Migration of Frame Selectors in a Hierarchy of Frame Selectors

One limitation of the above-described frame selector migration process is that it relies on an existing call connection being reduced to a single handoff leg during the call in order to activate the frame selector migration process. This reduction in the number of handoff legs on a particular Radio Network Controller is unpredictable and may not occur with reasonable frequency in areas of high cell density. The use of a hierarchy of frame selectors with the above-noted frame selector migration addresses this problem.

Figure 4A:
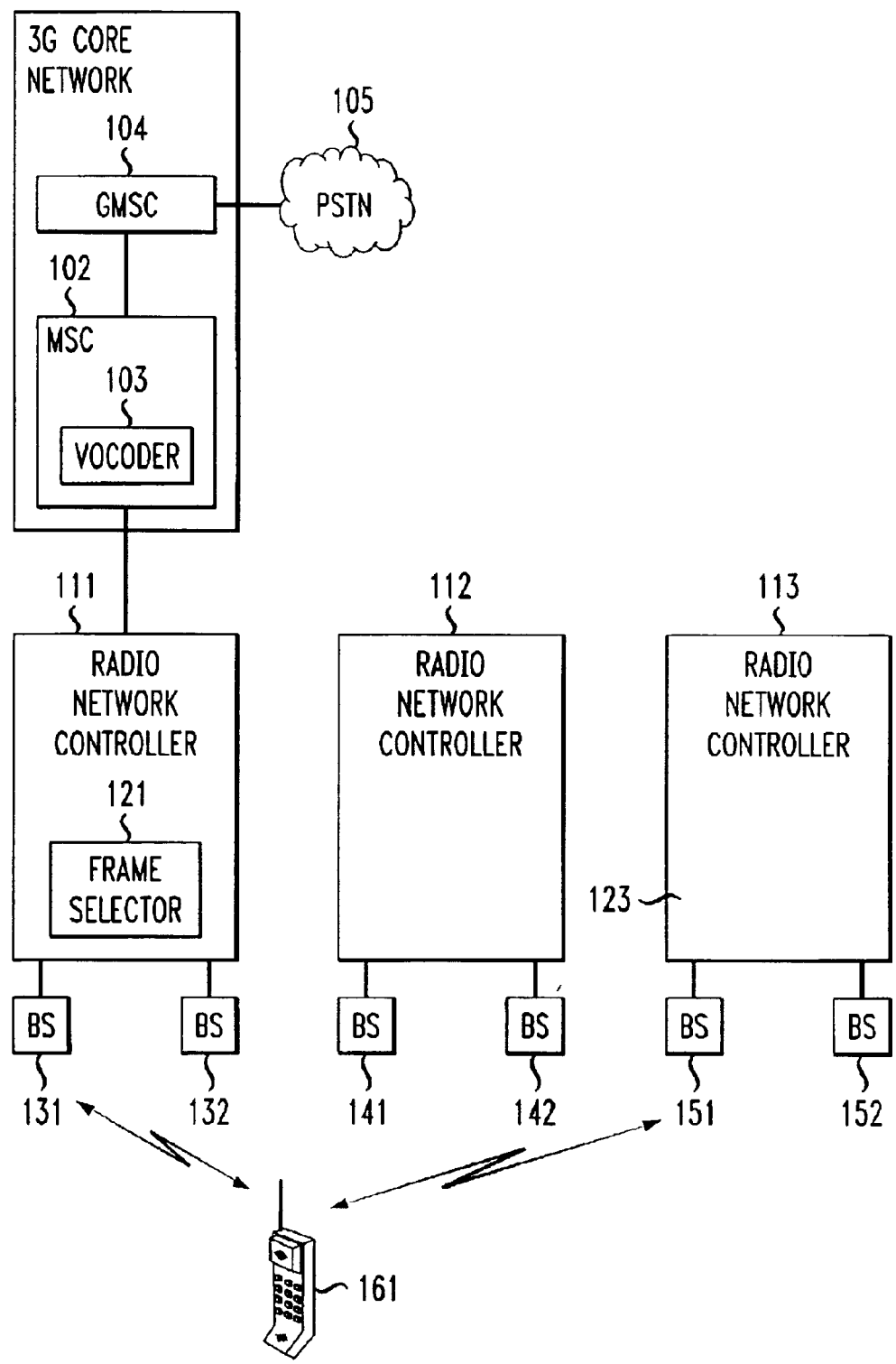
FIGS. 4A–4C illustrate in block diagram form the sequence of network connections used by the system for frame selector migration in 3G cellular networks to reduce the number of legs required to serve a call using a hierarchy of frame selectors.
Figure 4B:
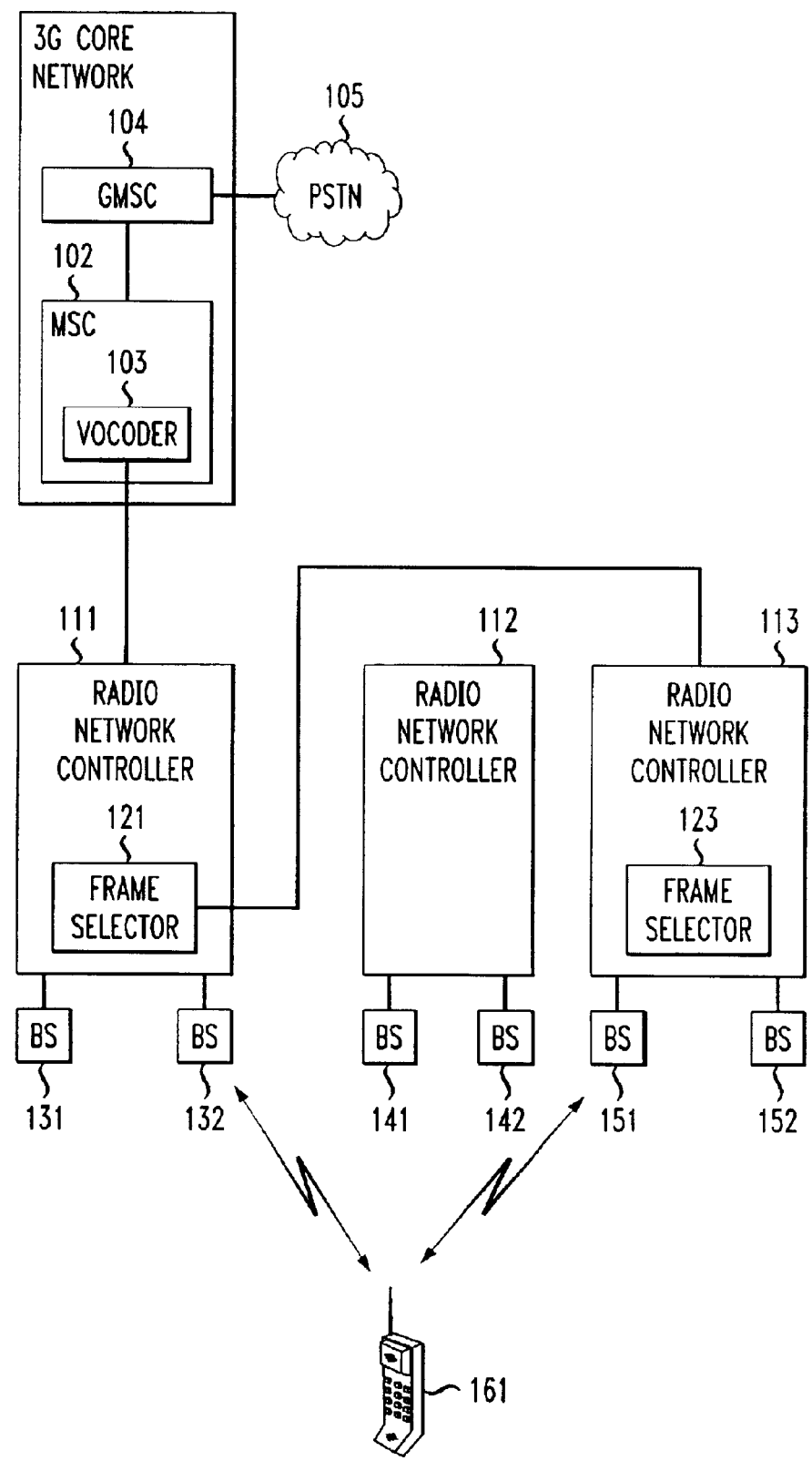
Figure 4C:
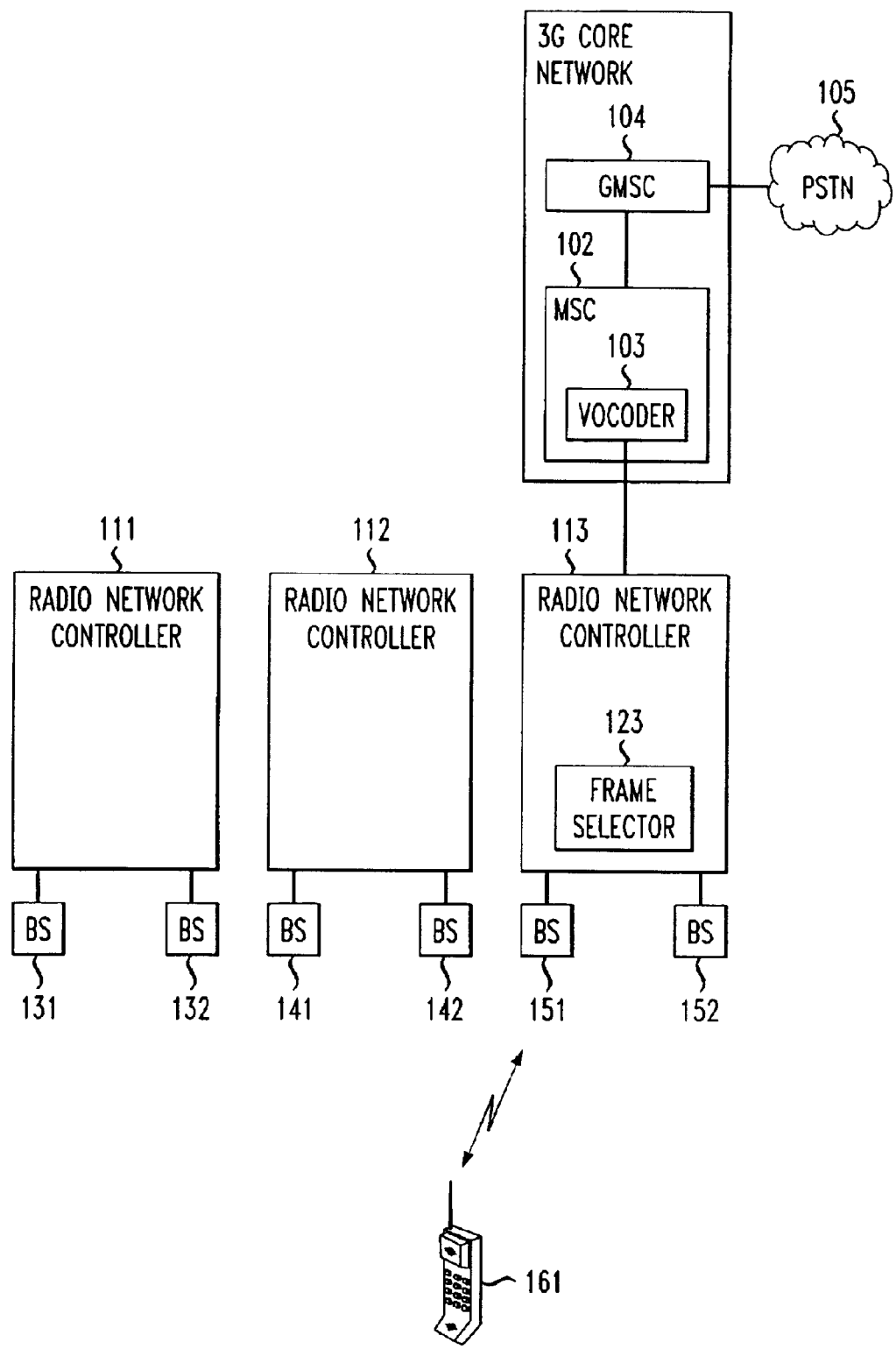
Figure 5:
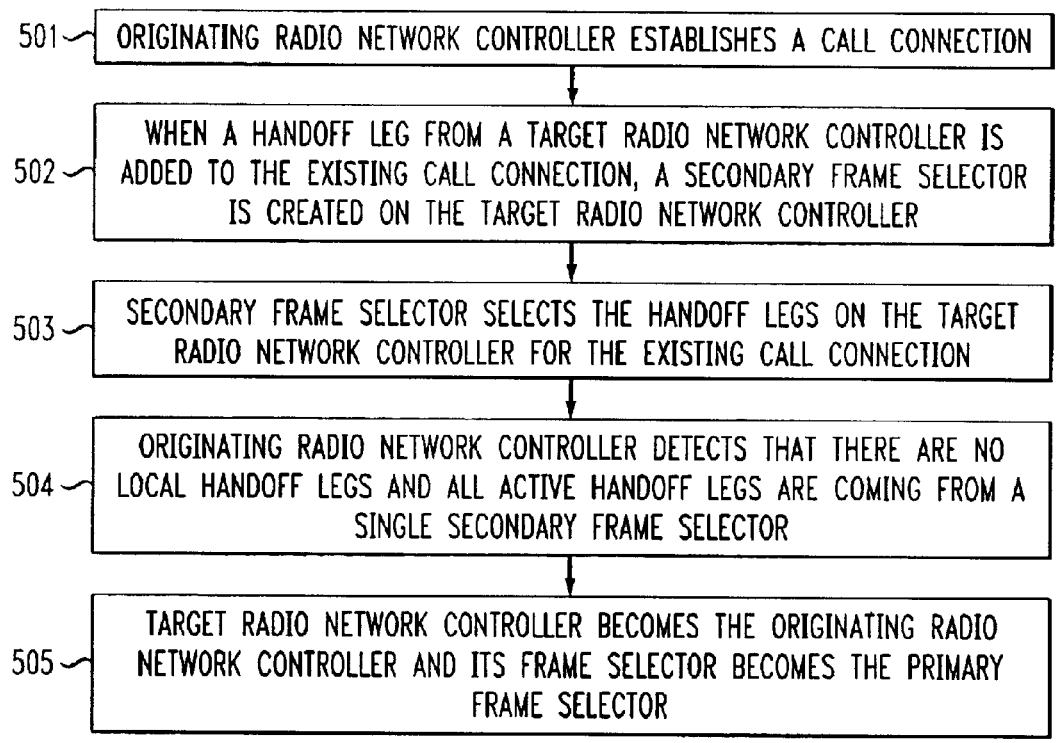
FIG. 5 illustrates in flow diagram form the operation of the system for frame selector migration in 3G cellular networks to reduce the number of legs required to serve a call using a hierarchy of frame selectors.

FIGS. 4A–4C illustrate in block diagram form the sequence of network connections used by the system for frame selector migration in 3G cellular networks 400 to reduce the number of handoff legs required to serve an existing call connection using a hierarchy of frame selectors and FIG. 5 illustrates in flow diagram form the operation of the system for frame selector migration in 3G cellular networks 400 to reduce the number of handoff legs required to serve an existing call connection using a hierarchy of frame selectors.

In addition to the basic frame selector migration process described above with respect to FIGS. 2A–2E and FIG. 3, the cellular network 100 can be equipped with a hierarchy of frame selectors, which makes use of multiple levels of frame selectors in the cellular network 100. The primary frame selector 121 is located at the originating Radio Network Controller 111, where the call is established at step 501. The primary frame selector 121 establishes the timing with the vocoder 103 and coordinates the power control for the mobile subscriber station 161. As handoff legs are added on this Radio Network Controller 111 to the existing call connection, they are added to the primary frame selector 121. When a handoff leg from another (target) Radio Network Controller 113 is added to the existing call connection at step 502, a secondary frame selector 123 is created on the target Radio Network Controller 113 at step 503 and selects the handoff legs for the existing call connection within the call coverage area of the target Radio Network Controller 113. As additional handoff legs are added from cells associated with Base Stations 131, 132 on target Radio Network Controller 113 to maintain service for the roving mobile subscriber station 161, the secondary frame selector 123 manages and is connected to these handoff legs that are established on the target Radio Network Controller 113. When the originating Radio Network Controller 111 with the primary frame selector 121 detects at step 504 that there are no local handoff legs and all active handoff legs are coming from a single secondary frame selector 123, the target Radio Network Controller 113 in which the secondary frame selector 123 is operational can become the originating Radio Network Controller and its frame selector 123 becomes the primary frame selector. The above-noted migration process of steps 303–310, described above, is used to effect this transition, with the simplification being that the secondary frame selector 123 is already established and only needs to begin using the timing and power control information resident in the primary frame selector 121.

In this process, when the last handoff leg on a target Radio Network Controller 113 is dropped, the secondary frame selector 123 is also removed, since it is unnecessary due to the presence of the primary frame selector 121. This approach uses only one soft handoff leg per Radio Network Controller to traverse to the primary frame selector rather than one handoff leg per cell. In most cases only one handoff leg is needed, rather than two or three that might exist without this approach. Since frame selectors are added when handoff legs are added and frame selectors are dropped when handoff legs are dropped, there is no disruption of the call. The secondary frame selector operates only to select the best handoff leg, similar to a softer handoff at the cell.

Additional Call Management Considerations

One additional consideration is that several Radio Network Controllers can have handoff legs on a call and the primary frame selector cannot be migrated. One way to reduce the occurrence of this problem is to intelligently prune low power handoff legs from the existing call connection. If there are only two Radio Network Controllers with handoff legs on the existing call connection, all of the handoff legs on the Radio Network Controller with the primary frame selector are determined to be below a present power threshold, and it is also determined that none of these handoff legs were the last added, then these handoff legs can all be dropped and the primary frame selector is ready for migration as noted above. Alternatively, if there are no handoff legs on the Radio Network Controller with the primary frame selector, there are only two other Radio Network Controllers with handoff legs on the existing call connection, all of the handoff legs on one of these other Radio Network Controllers are determined to be below a present power threshold, and it is also determined that none of these handoff legs were the last added, then these handoff legs can all be dropped and the primary frame selector is ready for migration as noted above to the one Radio Network Controller that has handoff legs on the existing call connection.

Summary

The system for frame selector migration in 3G cellular networks enables the frame selector function to be migrated to the presently active Radio Network Controller without disruption of the call. This migration strategy functions to reduce the number of handoff legs required to serve an existing call connection, therefore more efficiently utilizing the network resources.

What is claimed:

1. A system for migrating call connections among frame selectors in a cellular network, wherein said cellular network comprises a centralized vocoder circuit and a plurality of radio network controllers, each of which contains a frame selector and serves at least one base station which functions to communicate via radio frequency signals with mobile subscriber stations operating within the coverage area of the base station, comprising:

means, responsive to the presence of a single handoff leg on an existing call connection served by a frame selector located in a first radio network controller and extending to another radio network controller, for transmitting a message to said another radio network controller asking it to create a frame selector for this existing call connection; and means for transmitting frame timing and power control information for this existing call connection to said another radio network controller.

2. The system for migrating call connections among frame selectors of claim 1 further comprising:

means for continuing to transmit frames, that are received over said single handoff leg from said another radio network controller, to the vocoder and frames, received from said vocoder to said another radio network controller over said single handoff leg.

3. The system for migrating call connections among frame selectors of claim 2 further comprising:

means, located in said another radio network controller, for creating a frame selector for said existing call connection; and means for initializing said created frame selector with the frame timing and power control information received from said first radio network controller.

4. The system for migrating call connections among frame selectors of claim 3 further comprising:

means, located in said another radio network controller, for discontinuing transmission of frames to said first radio network controller.

5. The system for migrating call connections among frame selectors of claim 4 further comprising:

means, located in said another radio network controller, for buffering frames at said created frame selector for transmission to said first radio network controller.

6. The system for migrating call connections among frame selectors of claim 5 further comprising:

means, located in said another radio network controller, for transmitting data indicative of an address of said another radio network controller to said first radio network controller.

7. The system for migrating call connections among frame selectors of claim 5 further comprising:

means, located in said another radio network controller, for transmitting said buffered frames from said created frame selector to said vocoder.

8. The system for migrating call connections among frame selectors of claim 7 further comprising:

means for transmitting a message to said first radio network controller to request deactivation of the frame selector that is used for this call.

9. A method of migrating call connections among frame selectors in a cellular network, wherein said cellular network comprises a centralized vocoder circuit and a plurality of radio network controllers, each of which contains a frame selector and serves at least one base station which functions to communicate via radio frequency signals with mobile subscriber stations operating within the coverage area of the base station, comprising:

transmitting, in response to the presence of a single handoff leg on an existing call connection served by a frame selector located in a first radio network controller and extending to another radio network controller, a message to said another radio network controller asking it to create a frame selector for this existing call connection; and transmitting frame timing and power control information for this existing call connection to said another radio network controller.

10. The method for migrating call connections among frame selectors of claim 9 further comprising:

continuing to transmit frames, that are received over said single handoff leg from said another radio network controller, to the vocoder and frames, received from said vocoder to said another radio network controller over said single handoff leg.

11. The method for migrating call connections among frame selectors of claim 10 further comprising:

creating, in said another radio network controller, a frame selector for said existing call connection; and initializing said created frame selector with the frame timing and power control information received from said first radio network controller.

12. The method for migrating call connections among frame selectors of claim 11 further comprising:

discontinuing, in said another radio network controller, transmission of frames to said first radio network controller.

13. The method for migrating call connections among frame selectors of claim 12 further comprising:

buffering, in said another radio network controller, frames at said created frame selector for transmission to said first radio network controller.

14. The method for migrating call connections among frame selectors of claim 13 further comprising:

transmitting, from said another radio network controller, data indicative of an address of said another radio network controller to said first radio network controller.

15. The method for migrating call connections among frame selectors of claim 13 further comprising:

transmitting, from said another radio network controller, said buffered frames from said created frame selector to said vocoder.

16. The method for migrating call connections among frame selectors of claim 15 further comprising:

transmitting a message to said first radio network controller to request deactivation of the frame selector that is used for this call.

* * * * *